United States Patent [19]
Baker, III

[11] Patent Number: 5,864,822
[45] Date of Patent: Jan. 26, 1999

[54] BENEFITS TRACKING AND CORRELATION SYSTEM FOR USE WITH THIRD-PARTY ENABLING ORGANIZATION

[76] Inventor: Bernard R. Baker, III, 127 Seaspray Ave., Palm Beach, Fla. 33480

[21] Appl. No.: 670,358

[22] Filed: Jun. 25, 1996

[51] Int. Cl.$^6$ ........................................... G06F 17/60
[52] U.S. Cl. ............................................... 705/14
[58] Field of Search .................... 395/202, 204, 395/205, 206, 210, 214; 705/2, 4, 5, 10, 14

[56] References Cited

U.S. PATENT DOCUMENTS

| | | |
|---|---|---|
| 3,533,084 | 10/1970 | Cook et al. . |
| 3,622,995 | 11/1971 | Dilks et al. . |
| 3,705,384 | 12/1972 | Wahlberg . |
| 3,822,375 | 7/1974 | Ozeki et al. . |
| 4,449,186 | 5/1984 | Kelly et al. . |
| 4,479,196 | 10/1984 | Ferrer et al. . |
| 4,711,994 | 12/1987 | Greenberg . |
| 4,752,876 | 6/1988 | Couch et al. . |
| 4,775,936 | 10/1988 | Jung . |
| 4,788,643 | 11/1988 | Trippe et al. . |
| 4,794,530 | 12/1988 | Yukiura et al. . |
| 4,845,625 | 7/1989 | Stannard . |
| 4,860,198 | 8/1989 | Takenaka . |
| 4,862,357 | 8/1989 | Ahlstrom et al. . |
| 4,922,439 | 5/1990 | Greenblatt . |
| 4,931,932 | 6/1990 | Dalnekoff et al. . |
| 4,965,437 | 10/1990 | Nagai . |
| 4,984,156 | 1/1991 | Mekata . |
| 4,988,849 | 1/1991 | Sasaki et al. . |
| 5,021,953 | 6/1991 | Webber et al. . |
| 5,070,470 | 12/1991 | Scully et al. . |
| 5,088,586 | 2/1992 | Isobe et al. . |
| 5,095,195 | 3/1992 | Harman et al. . |
| 5,124,912 | 6/1992 | Hotaling et al. . |
| 5,151,692 | 9/1992 | Hirahara . |
| 5,191,523 | 3/1993 | Whitesage . |
| 5,225,665 | 7/1993 | Zerfahs et al. . |

(List continued on next page.)

OTHER PUBLICATIONS

Article from "Skiing " Magazine, entitled Get Your Free Hotel Rooms Here!; Feb., 1995 issue, pp. 47 and 55.
Article from "Travel Weekly", entitled Agency Sells Bargain Travel Data Base, Nov. 26, 1990.
Article from "Travel Weekly", entitled Properties Court Guests with New Services, Refurbishments. vol. 55, No. 4 Jan. 15, 1996.
Article from "Travel Weekly", entitled Software Firm Rolls Out Travel Management Product Sep. 11, 1995, vol. 54, No. 72.
Article from "Travel Weekly", entitled Software Development Group Unveils Client Data Base Product, May 25, 1995, vol. 54, No. 41.

(List continued on next page.)

Primary Examiner—Gail O. Hayes
Assistant Examiner—Phillip Groutt
Attorney, Agent, or Firm—Quarles & Brady

[57] ABSTRACT

A computer system and method for permitting a consumer to more effectively make use of a variety of available benefits from a plurality of goods and service providers, wherein the benefits are offered specifically to those consumers having an association with one or more enabling organizations. The system includes a memory for storing consumer information, enabling organization information and benefit correlation information. Input hardware is provided for inputting into the computer system certain identification information for a consumer and a set of consumer purchase plan data for the consumer. The system compares the identification information to the consumer information to determine those enabling organizations, if any, to which the consumer has an affiliation. The enabling organization information is then analyzed along with benefit correlation information to determine whether any enabling organization to which the consumer is affiliated is offering a potentially applicable benefit for the purchase plan data. The system also determines whether the purchase plan data satisfies all requirements for obtaining the potentially applicable benefit and displays the results.

17 Claims, 4 Drawing Sheets

U.S. PATENT DOCUMENTS

| | | |
|---|---|---|
| 5,225,990 | 7/1993 | Bunce et al. . |
| 5,230,499 | 7/1993 | Schneider . |
| 5,237,499 | 8/1993 | Garback . |
| 5,239,480 | 8/1993 | Huegel . |
| 5,253,165 | 10/1993 | Leiseca et al. . |
| 5,253,166 | 10/1993 | Dettelbach et al. . |
| 5,255,184 | 10/1993 | Hornick et al. . |
| 5,270,921 | 12/1993 | Hornick . |
| 5,289,369 | 2/1994 | Hirshberg . |
| 5,289,370 | 2/1994 | Lirov . |
| 5,289,371 | 2/1994 | Abel et al. . |
| 5,301,105 | 4/1994 | Cummings, Jr. . |
| 5,309,355 | 5/1994 | Lockwood . |
| 5,311,425 | 5/1994 | Inada . |
| 5,331,546 | 7/1994 | Webber et al. . |
| 5,404,291 | 4/1995 | Kerr et al. . |
| 5,408,417 | 4/1995 | Wilder . |
| 5,422,809 | 6/1995 | Griffin et al. . |
| 5,459,859 | 10/1995 | Senda . |
| 5,463,546 | 10/1995 | Parkhurst . |
| 5,475,585 | 12/1995 | Bush . |

OTHER PUBLICATIONS

Article from "Travel Weekly", entitled Site on Internet to Consolidate Discount Travel, Apr. 10, 1995, vol. 54, No. 28.

Article from "Travel Weekly", entitled Mileage Tracking System Developed–Frequent Travel Management a Data Base Company in Philadelphia Pennsylvania Helps Travellers Track Bonus Travel Points, Nov. 8, 1993.

Article from "Money" Magazine, entitled Travel Clubs Can Cut Your Vacation Costs in Half, Feb. 1, 1993.

Article from "Travel Weekly" entitled Direct Travel's E–Mail System Links Reservations, Data Base, Nov. 16, 1992.

Article from "Travel Weekly" entitled Systems Expert Sees Growing Interest in Destinations Data Bases. Apr. 27, 1992, vol. 51, No. 34.

Article from "Travel Weekly" entitled Technically Speaking Feb. 13, 1992.

Newspaper Article from "The Philadelphia Inquirer", Business Travel Column, Apr. 25, 1994.

Newspaper Article from "Philadelphia Business Journal", entitled Rosenbluth Control Room Monitors the World Apr. 22, 1994.

Article from "Dayton Daily News" entitled Going Somewhere? If You're Using Freequent Flier Mileage, It Might Be Tougher Thank You Think, Apr. 10, 1995.

Article from "New York Newsday", entitled Digital Traveler, Agents On–line: It's a New World, May 14, 1995.

Article from "Travel Weekly", entitled International Rebating Sep. 11, 1995, vol. 54, No. 72, p.66.

Article from "Business Wire" entitled CSC Signs Global Travel Pact with Rosenbluth International, Aug. 16, 1993.

Newspaper article entitled Pros Offer Insight on Bargain Airfares, Aug. 22, 1995, USA Today.

Printouts of screen displays for SABRE web site pages.

BENEFITS TRACKING AND CORRELATION SYSTEM FOR USE WITH THIRD-PARTY ENABLING ORGANIZATION

FIELD OF THE INVENTION

This invention relates generally to the field of computerized purchase planning, and more particularly to a system for allowing a consumer to take advantage of discounts and benefits available from a group of goods and service providers, where the benefits are offered only to those consumers having an association or affiliation with one or more third-party benefit-enabling organizations.

DESCRIPTION OF THE RELEVANT PRIOR ART

It is quite common today for many types of organizations to make available exclusively to their members, special discounts and benefits. Often, these discounts and benefits are not provided directly through the membership organization, but are instead obtained through third-party suppliers of goods and services. In such cases, the membership organization to which individuals belong, acts as an "enabling" type of organization in the sense that it does not directly provide a benefit or discount, but instead enables discounts or benefits available through a third party. A very common example of this type of arrangement may be found in the case of certain credit card companies which will offer to their cardholders certain discounts and benefits when such cardholders purchase goods and services from third-party entities such as airlines, rental car companies, restaurants, and particular retail stores. As a second example, if a consumer holds a credit card from a particular bank, the bank may offer extended warranties or discounted prices when a consumer purchases brand X products, or purchases products from a particular retail store. As third example, members of a particular professional organization may be entitled to a 10% discount at all hotel facilities operated by a particular hotel franchise or chain. These types of arrangements serve a dual purpose in that they allow a membership organization to provide additional benefits to its members, while simultaneously encouraging such members to patronize a particular third-party provider of goods or services.

In recent years, the popularity of programs, such as those described above, have increased to the point where consumers belonging to a number of different organizations often find themselves inundated by mailings and informational notices which enthusiastically inform them of the many and varied benefits available to them by virtue of their organizational membership.

The number and nature of the discounts and benefits made available to consumers through such organizations, as well as the timing restrictions and special conditions often applicable to such discounts and benefits, has resulted in a situation where their potential usefulness has been greatly diminished. The reason for this is that it is quite difficult for the average busy individual to maintain a record and cross-reference the multitude of benefits and discounts available in a manner which will allow such benefits to be easily ascertained, and thereby used, when the consumer in fact intends to purchase a particular type of goods or services. This problem has been found to exist generally but perhaps is particularly prevalent in connection with the making of travel arrangements, where expenditures for airline fares, hotels, rental cars and restaurants may involve substantial sums of money. Consumers who are familiar with the time-consuming nature of making travel arrangements can well appreciate that the additional effort required to ascertain any available discounts and benefits offered through the multitude of membership organizations to which the consumer belongs, often seems to be more trouble than it is worth. Consequently, such travel discounts and benefits often go ignored or forgotten, and are therefore unused, thereby defeating their purpose.

Accordingly, it would be desirable to provide a system whereby organizations which "enable" discounts and benefits from third-party service and/or goods providers could do so in a manner which allows the members to more advantageously make use of such benefits and discounts. It is a further object of this invention to supply third-party providers of goods and services with a marketing medium whereby consumers seeking specific travel services or other products, may be made aware of special discounts or benefits on very short notice.

SUMMARY OF THE INVENTION

According to one aspect of the invention, a purchase-planning system is provided for permitting a consumer to more effectively make use of a variety of available discounts and benefits from a plurality of goods and service providers. The system is advantageously designed for situations wherein the discounts or benefits (hereinafter collectively referred to as "benefits") are limited in availability to those consumers having an association or affiliation with one or more third-party enabling organizations.

Generally speaking, the system is comprised of a database containing certain specific types of data relating to enabling organizations, the specific benefits enabled by such organizations, and consumer information identifying one or more enabling organizations to which an individual consumer has an association. The system preferably includes at least one data entry device, such as a computer keyboard, for entering data concerning a consumer and the type of goods or services he wishes to purchase. Also at least one display device, such as a CRT, is preferably used for displaying benefits and to prompt a user regarding entry of data. An electronic processor is provided, coupled with the data base, and each of the data entry devices, and display devices.

The processor is designed to be responsive to the data entry device, so that it may determine whether a particular consumer is associated with one or more of the third-party enabling organizations which enable benefits. If the consumer has such an affiliation, the system will compare the consumer's purchase information with those specific benefits enabled by the enabling organizations, and determine which of the benefits, if any, will be potentially useful to the consumer for a given set of purchase plans. This "correlated" benefit information is then displayed by the system on the display device, whereupon the consumer may determine which, if any, of the correlated benefits will actually be used.

Significantly, while the system may be used with any type of goods or services a consumer might wish to purchase, it is particularly advantageous in connection with travel planning, which may involve a sometimes complex set of logistical parameters associated with a travel itinerary. Under these circumstances, the system's ability to correlate available benefits with a consumer's travel plans can be especially useful.

These and other aspects of the present invention will become apparent after a review of the following specification and drawings.

BRIEF DESCRIPTION OF THE DRAWINGS

There are shown in the drawings embodiments which are presently preferred, it being understood, however, that the invention is not so limited to the precise arrangement and instrumentalities shown, wherein.

DETAILED DESCRIPTION OF THE PREFERRED EMBODIMENTS

Figure 1:
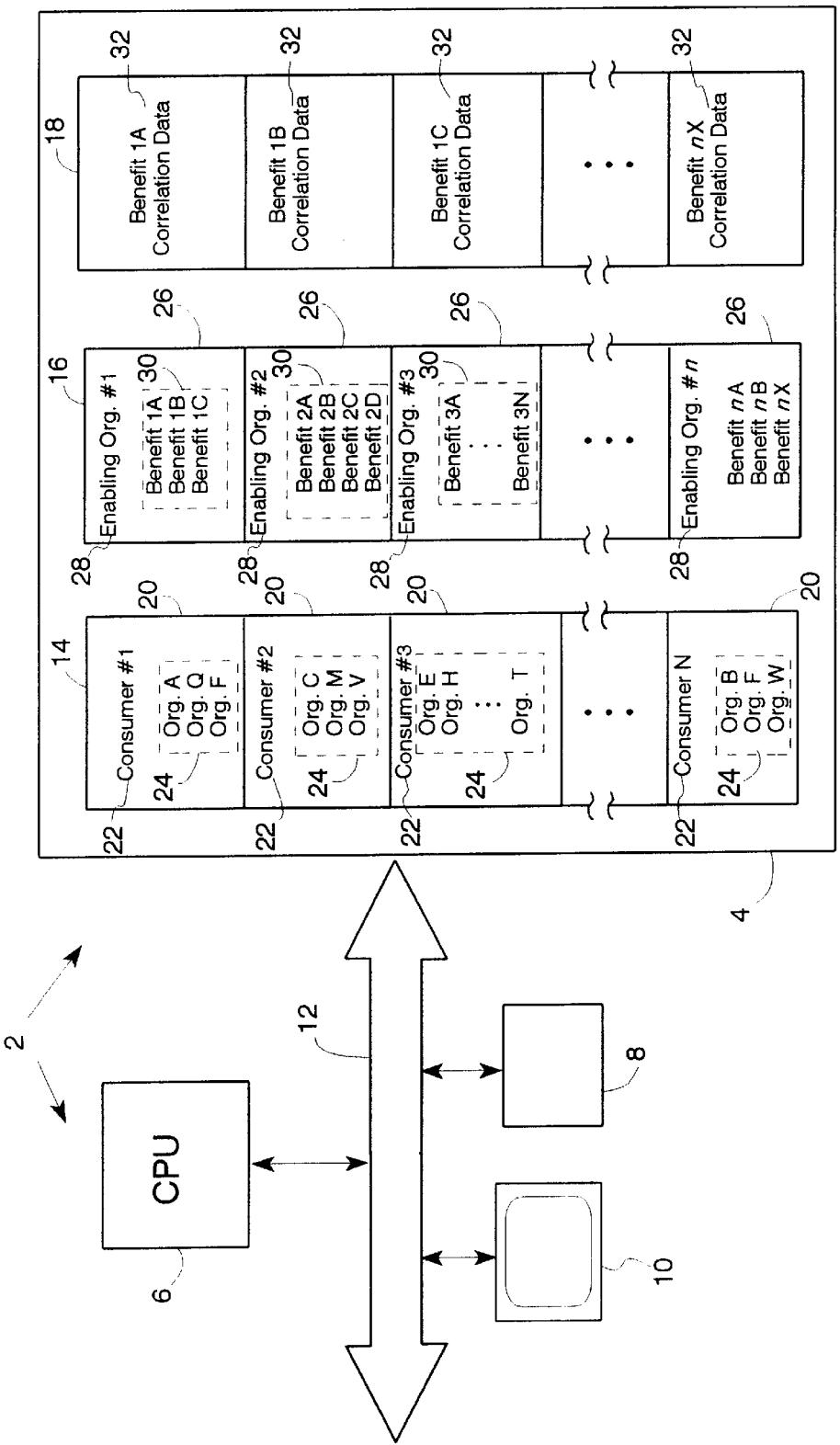
FIG. 1 is a block diagram representing the computerized system according to the present invention.

According to the present invention, a computerized system is shown in FIG. 1 which permits consumers to more effectively make use of a variety of available benefits from a plurality of goods and service providers. As used herein, the term "benefits" shall be understood to mean any discounted rate or any other added value received by a consumer in addition to those otherwise offered to the general public. The invention particularly facilitates use of benefits which are offered to those consumers having an association with one or more third-party enabling organizations. The invention allows consumers to make advantageous use of such benefits offered through third party enabling organizations by correlating the specific benefits offered with the needs of the consumer when he is ready to purchase.

As shown in FIG. 1, the system 2 is comprised of a database 4 and a central processing unit 6. In addition, the system includes at least one data entry device 8 and at least one display unit 10. The central processing unit (or CPU) 6 is electronically coupled to the database, data entry device 8 and display unit 10 by suitable means such as a digital data buss 12. However, the invention is not limited in this regard, and any suitable electronic means can be utilized for coupling the CPU 6 to the display device 10, data entry device 8 and database 4.

Figure 2:
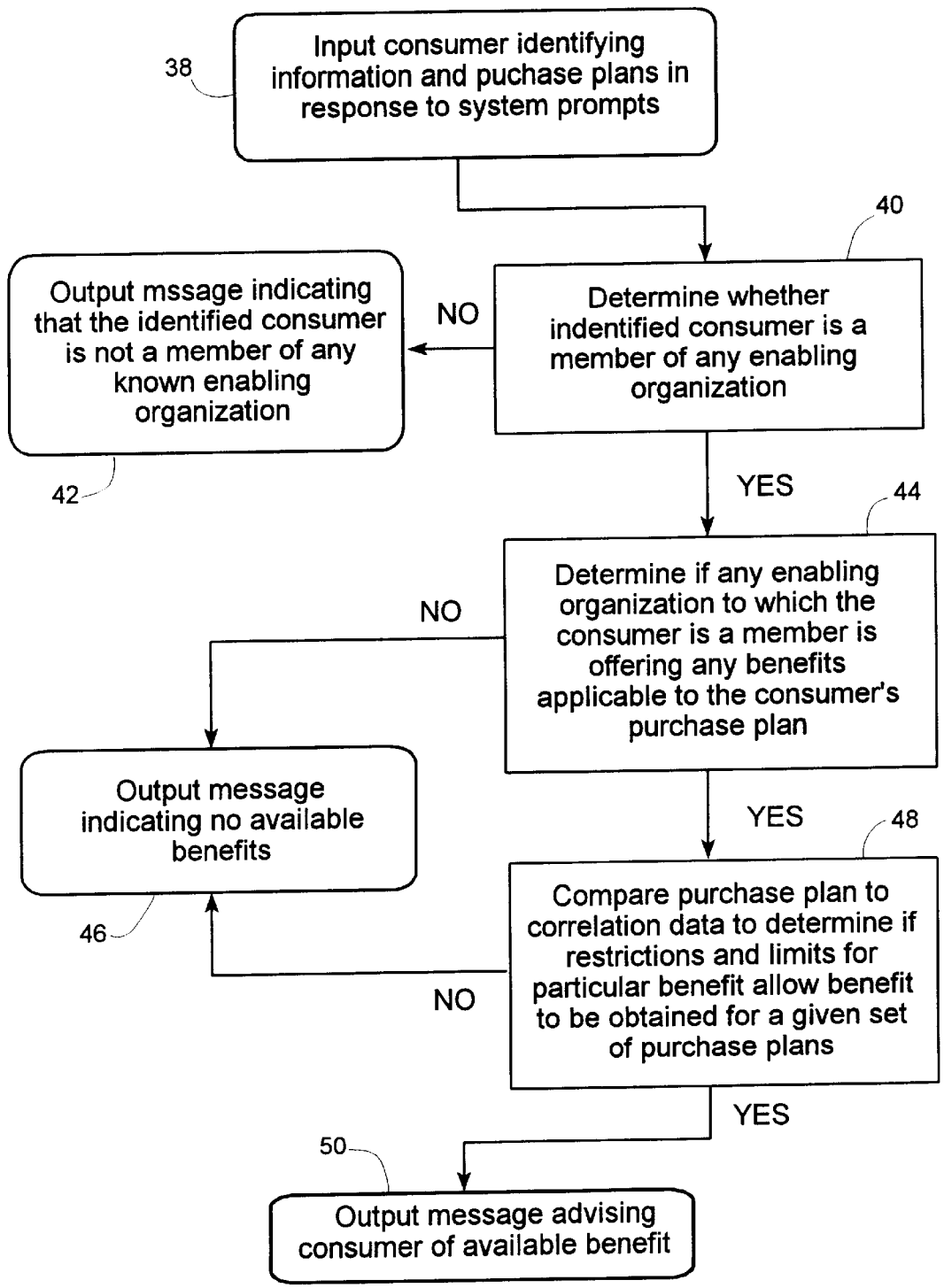
FIG. 2 is a flow chart showing the basic method of operation of the system according to the invention.

CPU 6 can be any suitable microprocessor or other electronic processing unit as is well known to those skilled in the art. An example of such a processor would include the Pentium brand microprocessor available from Intel Corporation or any equivalent such as a 586 type microprocessor. Display unit 10 would typically comprise a cathode ray tube (CRT) or other electronic device for displaying information. The data entry device 8 would typically be a computer keyboard for entering data. However, a touch screen display or other graphical user interface combined with a mouse could also be used for this purpose. Although a single data entry unit and display device are shown in FIG. 1, it is to be understood that any number of display units and data entry devices could be coupled to an appropriate central processing unit as shown in FIG. 2.

The various hardware requirements for the system as described herein can generally be satisfied by any one of many commercially available high speed personal computers offered by manufacturers such as Compaq, Hewlett Packard, or IBM Corp. The specific electronic and magnetic hard drive memory requirements for the system depend upon the volume of benefits to be tracked by the system as well as the number of users. Likewise, processing speed can be chosen to provide a suitable combination of speed and cost effectiveness for the anticipated demands to be placed upon the system. Alternatively, any other type of computer with sufficient processing speed and memory capability can also be used for the purposes of the invention.

In a preferred embodiment, the system can be designed to operate with any specifically chosen computer operating system such as Windows 95, Windows 2.0, or MS-DOS available from Microsoft, Inc. Alternatively, the system may also be designed to work with other operating systems such as UNIX. In this regard, it should be understood that the system as disclosed herein is an "application program" which can be designed to operate with practically any conventional and commercially available computer operating system. Further, the system as designed herein can be implemented by any programmer of ordinary skill in the art using commercially available development tools for the operating systems described above.

The database 4 is preferably comprised of information stored in electronic memory or other machine readable medium such as a hard magnetic disk drive, optical disk, or other suitable medium. The database includes information relating to at least three general categories including (1) consumer information, (2) enabling organization information and (3) correlation information. Consumer information generally includes an identifying name or number for a particular consumer. The consumer identification information is associated with an identifying list of organizations to which the particular consumer is a member, or has an affiliation. As used herein, the term "associated" refers to any method of programming or arrangement of data which would permit processor 6 to retrieve a list of the particular consumer's enabling organizations once it has been provided with the consumer's identification information.

The second category of information, relating to enabling organizations, generally includes a list of certain specific organizations which make available one or more benefits for consumers associated with such enabling organization. As noted above, the term "benefits" as used herein shall be understood to mean a discounted rate or any other added value available to a member of the enabling organization, which is not generally available to the public. A list of the one or more benefits provided by each of the enabling organizations is associated with each such enabling organization. As used herein, the term "associated" refers to any method of programming or arrangement of data which enables processor 6 to retrieve a list of benefits made available by an enabling organization.

Finally, the database also includes correlation information. For the purposes of the present invention, "correlation information" shall be understood to mean detailed information provided for each benefit offered by an enabling organization which permits the CPU to determine whether a particular benefit may be of use to a particular consumer. Examples of such information might include geographic locations where a particular benefit may be available, as well as specific time frames for same. Likewise, the correlation information could also include actual price data to determine if the price of the goods or services is in the range a consumer is willing to pay. Correlation information is associated with benefits information in a manner which permits the processor 6 to readily retrieve correlation data for a specifically identified benefit.

Information relating to consumers, the organizations to which they belong, enabling organizations, benefits and correlation data may be arranged in the database 4 in any convenient format or form. Suitable data structures for accomplishing this purpose are well within the knowledge of those of ordinary skill in the art. Accordingly, no attempt shall be made herein to describe all of the various organizational methods and programming techniques by which such information can be arranged and retrieved. Instead, FIG. 1 merely shows one possible example of a manner in which the information could be organized for use in connection with the invention.

As shown in FIG. 1, database 4 may be organized so as to include a consumer file 14, an enabling organization benefit file 16, and a correlation file 18. Consumer file 14 is comprised of a plurality of individual consumer organization files 20, each of which may be identified by a consumer name or number associated therewith. In FIG. 1, the consumer identification information is listed as "Consumer #1", "Consumer #2", "Consumer #3", . . . "Consumer #N". In a fully operational system, the consumer identification information could be a social security number, credit card account number, or any other combination of letters and numbers which uniquely identify a particular individual authorized to use the system. Each consumer organization file 20 preferably includes a list of consumer organizations 24 to which the identified consumer has an affiliation or membership Typically, such consumer organizations or groups would include certain banks and credit card issuers, professional organizations, particular companies with organized employer groups, or any other group or membership organization to which a particular consumer belongs. Information relating to consumer affiliation with a particular organization may be supplied to the data base by either the consumer, the enabling organization, or by other suitable means.

In a preferred embodiment, the consumer organization listings 24 are limited to those organizations which are also included in the enabling organization file 16. Enabling organization file 16 is preferably comprised of a plurality of enabling organization benefit files 26 for each separately identified enabling organization 28. Each enabling organization 28 can be identified either by a name or number which has been defined to identify that particular organization. Each enabling organization benefit file 26 includes a benefits list 30 defining specific benefits enabled by a particular enabling organization 28. As noted above, an enabling organization can be any organization or group which makes available, for specific individuals who are members or associated with such enabling organization, special benefits which are not available to the general public.

As shown in FIG. 1, database 4 also includes a correlation file 18. Correlation file 18 contains specific information necessary for CPU 6 to determine whether a benefit available to a particular consumer by virtue of their association with an enabling organization 28 will have some potential usefulness to a consumer contemplating a particular purchase of goods or services. Thus, for a particular benefit listed in a benefit file 26, a benefit correlation data file (or sub-file) 32 would include information such as geographic locations of benefit availability, time periods, limits, conditions or other such factors necessary to determine whether the particular benefit listed in benefit file 26 will be of potential usefulness for a particular consumer.

As an example, if benefit 1A in enabling organization benefit file 26 is a discount hotel rate for a particular hotel chain, it would be preferable for benefit correlation data file 32 to contain information regarding the specific cities where the hotels are located and any time limitations or other restrictions associated with obtaining the benefit. The CPU 6 would compare the location where the consumer required hotel lodging, the time frame when the hotel rooms were needed, the price the consumer was willing to pay, and any other relevant factors, to determine whether the lodging requirements of the consumer matched one of the hotel locations offering discounts pursuant to benefit 1A. Such information would then be provided to display screen 10 for viewing by an operator.

A similar process would occur for other types of travel arrangements. If a consumer wished to travel by air between two cities, itinerary information would be provided to the central processing unit which would go through the process of (1) checking consumer file 14 to determine whether such consumer was a member of any organization in the consumer organization files 20; (2) search the applicable enabling organization files 28 to determine whether any benefits offered by the enabling organization (and to which the consumer was a member) were available relating to discount air fares. In the event the enabling organization file included discount air fares, a benefit correlation file 32 would then be checked by processor 6 to determine whether such travel benefits were applicable for a specific itinerary, e.g. between the cities in which the consumer intended to travel, the particular time frames for travel, etc.

In a preferred embodiment, the system includes various display formats for correlated benefits information. The system is designed to identify benefits which are available for a particular travel itinerary or other purchase. In some instances, more than one benefit may be available or there may be circumstances where a benefit may only be available when a combination of goods or services are purchased. An example of such a situation would be where an airline offers discount airfares to those consumers who have a particular brand of credit card when the consumers stay at a specific hotel upon arrival at a destination. In such instances, the system can display alternative travel arrangements or purchase alternatives and display them in an organized manner.

In one embodiment, the system is capable of identifying alternative benefit information in a list formatted in increasing purchase cost order. Alternatively the information may be formatted so that maximum value benefit alternatives (or combinations thereof) are listed first, followed by lesser value benefit alternatives. In this manner, a user may review the alternative benefit information to choose the combination of cost, convenience and preferences most suitable for a particular consumer.

Generally speaking, the input data required for processor 6 to determine whether a particular benefit is available to a particular consumer would depend upon the particular type of services or goods the consumer wished to purchase. In the case of consumers wishing to obtain travel benefits, such as discounts on air fares, rental cars, restaurants, etc., the user would be prompted to enter, via data entry device 8, an itinerary including all necessary information to determine whether a particular benefit was applicable. Such information typically would include travel dates, departure locations, destinations, need for ground transportation, and perhaps even restaurant preferences. Once provided with this information, processing unit 6 could search the database as described above with respect to FIG. 1, and then display suitable correlated benefit data provided by third-party enabling organizations.

Similarly, if the consumer had an interest in purchasing a particular type of goods such as a home appliance, the user would be prompted to provide data relating to the type of product the consumer wished to buy, and the geographic area to which the consumer was willing to make his purchase. Once again, the processor 6 would (1) search the database 4 to determine the organizations to which the consumer had a membership or affiliation; (2) compare the benefits available from such enabling organization(s) to the consumer's purchase plans to determine if any applicable benefit was available; and (3) compare the purchase plan with the correlation information to locate specific correlated benefits applicable for the consumer's purchase plans.

It should be noted that the foregoing are mere examples of the type of discounts and benefits that may be sought through the system 2, and the invention is not intended to be so limited. Rather, the invention allows consumers to take advantage of any benefit offered to specific consumers with respect to particular providers goods and services by virtue of such consumers affiliation with a third-party enabling organization. Likewise, it should be understood that the specific input data required to search for certain types of benefits can be varied as necessary, provided such data is sufficient to allow processor 6 to accurately obtain correlated benefit data. Finally, the specific data structures and search routines chosen to store benefit data, are not critical for the purposes of the invention. Instead, any suitable data structures and search routine may be used, provided that it enables processor 6 to search for and locate correlated benefit information applicable to a specific consumer for a specific set of purchase plans.

FIG. 2 is a flow chart which outlines the method according to the present invention. In step 38, a system operator inputs information via data entry device 8, which information includes a consumer identifying name or number and the consumer's purchase plans. The purchase plans can relate to any type of goods or services. In a preferred embodiment, the system is designed to prompt an operator for information related to a particular type of purchase. Thus, if the purchase relates to travel services, for example, the system would query the operator regarding the consumer's travel itinerary. Alternatively, if the purchase relates to a particular type of goods, the system would prompt the user for information such as the nature of the goods, preferred brands, price range, time period when the purchase will occur, geographical area where the consumer is willing to travel to make a purchase, etc.

In step 40, the system processor compares the consumer identifying information with consumer file 14 to determine whether a consumer is a member of any enabling organization. If not, an appropriate message is displayed to the user in step 42. If the consumer is a member of an enabling organization, the system proceeds in step 44 to determine whether any of the enabling organizations to which the consumer is a member is offering a benefit applicable to the consumer's purchase plan. If not, the system reports in step 46 that no benefits are available.

However, if an applicable benefit is located, the system proceeds to step 48 wherein the purchase plan is compared to benefit correlation data to determine whether restrictions and limitations on use of the particular benefit allow the benefit to be obtained by the consumers for a given set of purchase plans. If the correlation data reveals that benefit cannot be used due to any restrictions or limitation, the system will indicate the absence of available benefits in step 46. Alternatively, if the purchase plan does not conflict with the restrictions and limitations contained in the correlation data, the system will output a message advising the operator of the available benefit in step 50.

Significantly, in addition to the obvious direct benefits that consumers receive by making use of the above-described system, the system also offers great potential as a new and economical marketing tool. For example, the operator of the database could negotiate directly with the providers of goods and services to offer discounts to consumers participating in the database. In such cases, the organization operating the database would itself be the enabling organization.

Further, the system offers the unique benefit of allowing service and goods providers to make available specialized "niche" discounts or marketing schemes. Since the system sorts or correlates benefit information, it would allow providers of goods and services to target particular segments of the market. For example, in the travel industry, hotels could offer through the system special discounts at particular locations or for very short time frames, in a manner which would not otherwise be economically feasible with other marketing methods. In the case of those offering goods for sale, a geographically weak sector of the market or one which has excess inventory could be specifically targeted for discounts in the data base. In other words, the system allows particular segments of the market to be precisely targeted by providers of goods and services offering special discounts to consumers affiliated with enabling organizations.

A further advantage of the system relates to the relatively short lead times required in connection with offering benefits. According to the system, discounts could be developed and offered very quickly with very short lead times by simply adding an enabling organization benefit file to the database along with associated correlation information. This would enable a service provider to take advantage of rapidly changing conditions or short-term opportunities. As an example, several days before a scheduled flight, an airline might recognize that a flight was going to depart half-full. Under such circumstances, the airline might wish to offer discount benefits to members of particular enabling organizations which patronize the airline. The result is a marketing benefit for the airline and a special premium to the enabling organization, as well as its members.

Figure 3:
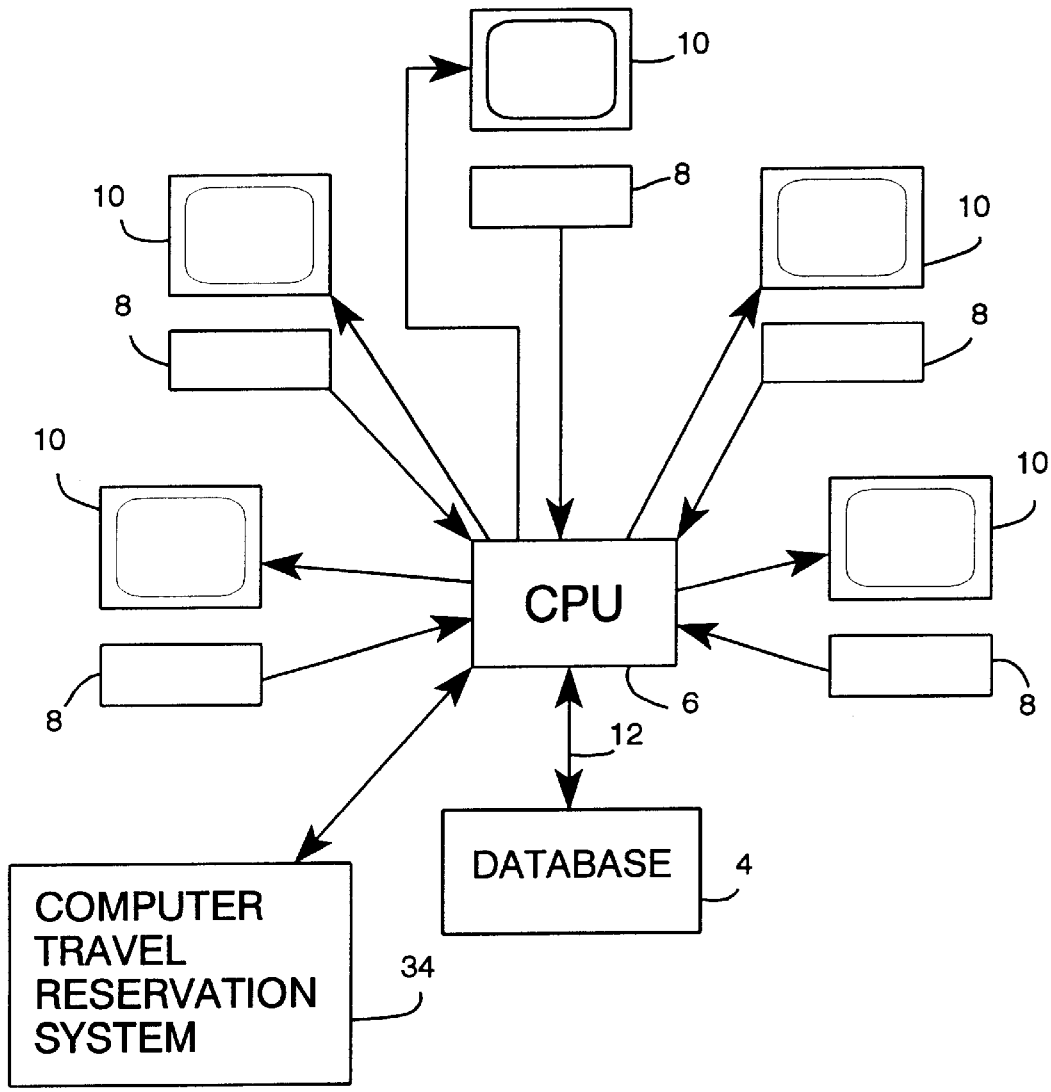
FIG. 3 is a block diagram representing the system of FIG. 1 used in conjunction with multiple data entry and display devices, and a computer travel reservation system.

As shown in FIG. 3, CPU 6 and database 4 may be connected to a plurality of data entry devices 8 and display units 10. In a preferred embodiment, data entry devices 8 and display units 10 may be part of a complete and independent personal computer unit. In such cases, the CPU 6 would be, in effect, a server unit for each of the computers attached to a local or wide area network.

Further, as shown in FIG. 3, processing unit 6 may also be linked by electronic means to a computer travel reservation system 34, such as the Sabre system, or other similar such systems. In such instances, the computer travel reservation system 34 would serve, in effect, as an additional or secondary correlation file for consumers seeking travel benefits. For example, if the processor 6 is provided with data indicating that a consumer wishes to travel between certain cities at certain times, and the processor 6 determines that discount travel benefits are available based upon a check of the consumer file 14, enabling organization file 16 and correlation file 18, the processor could then make a further determination whether any flights were available on the relevant travel dates from the particular airline for which the enabling organization was offering a benefit. If computer travel reservation system 34 indicated that all flights in a relevant time period were completely full, this would indicate a negative correlation between the consumer's needs and the benefits available. In such cases, the availability of the benefit would either not be indicated on display unit 10 or the lack of seating could be indicated in case the passenger wanted to consider flying "standby". Significantly, if the computer travel reservation system 34 were linked with processor 6, the system would provide the added benefit of allowing consumers making travel plans through the reservation system 34 to receive the benefits of the system according to the invention. In such circumstances, the data entry and display devices of the computerized travel reservation system would take the place of data entry device 8 and display 10. Correlated benefits data would be electronically communicated directly to an operator of the computerized travel reservation system 34.

Figure 4:
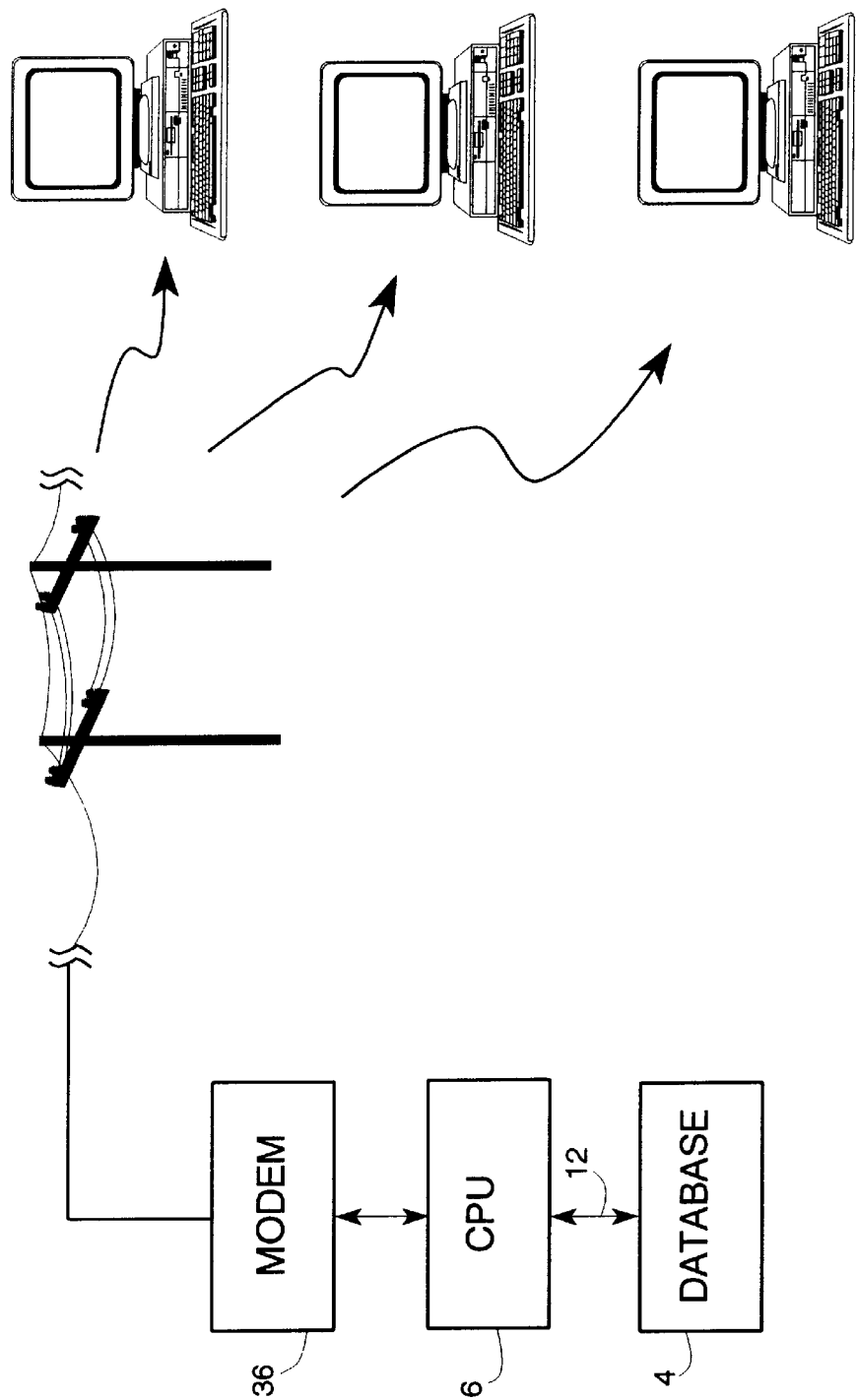
FIG. 4 is a block diagram of the system according to FIG. 1 further comprising a modem to allow a plurality of remote users to access the system.

Finally as shown in FIG. 4, it should be noted that the system according to the invention may advantageously be directly used by consumers with the use of a modem 36. The modem 36 allows remotely located consumers to directly query the system 2 regarding benefits information via a telephone link and a personal computer. In such cases, the task of display device 10 and data entry device 8 would be handled by the consumer's personal computer located in a home or office.

From the above description, it will be apparent that a purchase planning system has been disclosed for permitting a consumer to more effectively make use of a variety of available discounts and benefits from a plurality of goods and service providers, particularly where such benefits are offered only to those consumers having an association with one or more third-party enabling organizations. As the invention can be embodied in other specific forms without departing from the spirit or essential attributes of thereof, reference should be made to the following claims, rather than the foregoing specification, as indicating the true scope of the invention.

I claim:

1. A computer system for permitting a consumer to more effectively make use of a variety of available benefits from a plurality of goods and service providers, wherein said benefits are offered specifically to those consumers having an association with one or more third party enabling organizations, said computer system comprising:

A) means for storing in a memory in the computer system consumer information, enabling organization information and benefit correlation information;

B) means for inputting into said computer system identification information for a consumer and a set of consumer purchase plan data for said consumer;

C) means for comparing said identification information to said consumer information to determine those enabling organizations, if any, to which said consumer has an affiliation;

D) means for analyzing said enabling organization information and said benefit correlation information to determine whether any enabling organization to which the consumer is affiliated is offering a potentially applicable benefit for said purchase plan data and whether said purchase plan data satisfies all requirements for obtaining said potentially applicable benefit;

E) means for displaying a message to inform a system user of any available benefit applicable to said purchase plan data;

wherein said benefit includes at least one of a discounted rate and any other value available to the consumer as a result of the consumer's membership in said one or more enabling organizations.

2. The computer system according to claim 1 further comprising an electronic link to a computer based travel reservation system, said computer based travel reservation system providing additional benefit correlation information concerning travel services.

3. The computer system according to claim 2 wherein said additional benefit correlation information concerning travel services includes at least one of the group consisting of (1) transportation seating availability, scheduling and pricing, (2) hotel lodging availability, and price information, and (3) rental car availability and price information.

4. The computer system according to claim 1 further comprising means for displaying a plurality of available benefits applicable to said purchase plan data, said plurality of benefits listed by order of maximum benefit value received.

5. The computer system according to claim 1 further comprising means for displaying a plurality of available benefits applicable to said purchase plan data, said plurality of benefits listed by order of total cost incurred for satisfying a set of purchase plan data.

6. The computer system according to claim 1 wherein said purchase plan data can include a plurality of separate purchase plans.

7. The computer system according to claim 6 further comprising:

means for analyzing said enabling organization information and said benefit correlation information to determine a benefit applicable to the combination of said plurality of separate purchase plans.

8. The computer system according to claim 7 wherein said plurality of separate purchase plans are comprised of at least one of transportation services, hotel services, restaurant services and rental car services.

9. In a computer system, a method for permitting a consumer to more effectively make use of a variety of available benefits from a plurality of goods and service providers, wherein said benefits are offered specifically to those consumers having an association with one or more third party enabling organizations, said method comprising:

A) storing in a memory in the computer system consumer information, enabling organization information and benefit correlation information;

B) inputting identification information for a consumer and a set of consumer purchase plan data for said consumer into said computer system by means of a data entry device electronically communicating with said computer system;

C) operating the computer system to compare said identification information to said consumer information to determine those enabling organizations, if any, to which said consumer has an affiliation;

D) further operating said computer system to determine whether any enabling organization to which the consumer is affiliated is offering a benefit applicable to said purchase plan data;

E) displaying a message to inform a system user of any available benefit applicable to said purchase plan data.

wherein said benefit includes at least one of a discounted rate and any other value available to the consumer as a result of the consumer's membership in said one or more enabling organizations.

10. The method according to claim 9 wherein said purchase plan data can include a plurality of separate purchase plans.

11. The method according to claim 10 further comprising:

operating the computer system to analyze said enabling organization information and said benefit correlation information to determine a benefit applicable to the combination of said plurality of separate purchase plans.

12. The method according to claim 11 wherein said plurality of separate purchase plans are comprised of at least one of transportation services, hotel services, restaurant services and rental car services.

13. The method according to claim 9 further comprising providing an electronic link to a computer based travel reservation system for receiving additional benefit correlation information concerning travel services.

14. The method according to claim 13 wherein said additional benefit information correlation concerning travel services includes at least one of the group consisting of (1) transportation seating availability, scheduling and pricing information, (2) hotel lodging availability, and price information, and (3) rental car availability and price information.

15. The method according to claim 9 further comprising the step of displaying a plurality of available benefits applicable to said purchase plan data by order of maximum benefit value received.

16. The method according to claim 9 further comprising the step of displaying a plurality of available benefits applicable to said purchase plan data by order of total cost incurred for satisfying a set of purchase plan data.

17. A purchase planning system for permitting a consumer to more effectively make use of a variety of available benefits from a plurality of goods and service providers, wherein said benefits are offered only to those consumers having an association with one or more third party enabling organizations, said system comprising:

A) means for storing in machine-readable form a database comprised of:

1. enabling organization information identifying one or more of said enabling organizations which enable benefits from one or more of said goods and service providers;

2. benefits information for each of said enabling organizations, said benefits information identifying specific benefits each of said enabling organizations makes available for individuals associated with each of said enabling organizations;

3. consumer information identifying one or more of said organizations to which an individual travel consumer has an association;

B) at least one data entry device for entering data concerning a consumer's purchase plans, and at least one display device for displaying said benefits;

C) processor means coupled with said data base, said data entry and said display devices, said processor means responsive to said at least one data entry device, and for determining from said consumer information if a consumer is associated with one or more of said enabling organizations, said processor means automatically identifying benefits enabled by said enabling organization which may be used by a consumer for receiving benefits from goods and service providers which coincide with a consumer's purchase plans.

* * * * *